(12) United States Patent
Takimoto

(10) Patent No.: US 9,268,397 B2
(45) Date of Patent: Feb. 23, 2016

(54) INFORMATION PROCESSOR, INFORMATION PROCESSING METHOD, AND COMPUTER PROGRAM PRODUCT FOR PROCESSING INFORMATION INPUT BY USER

(71) Applicant: SONY CORPORATION, Tokyo (JP)

(72) Inventor: Yuuji Takimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 195 days.

(21) Appl. No.: 13/934,448

(22) Filed: Jul. 3, 2013

(65) Prior Publication Data

US 2014/0040738 A1 Feb. 6, 2014

(30) Foreign Application Priority Data

Jul. 31, 2012 (JP) ................. 2012-170451

(51) Int. Cl.
*G06F 3/048* (2013.01)
*G06F 3/01* (2006.01)
*G06F 17/24* (2006.01)
*G11B 27/00* (2006.01)
*G06Q 10/10* (2012.01)
*H04N 21/475* (2011.01)
*H04N 21/4788* (2011.01)
*H04N 21/488* (2011.01)
*G11B 27/031* (2006.01)
*G06F 17/21* (2006.01)
*G06F 17/30* (2006.01)
*G06F 3/0488* (2013.01)

(52) U.S. Cl.
CPC ............... *G06F 3/01* (2013.01); *G06F 17/241* (2013.01); *G06Q 10/10* (2013.01); *G11B 27/00* (2013.01); *G11B 27/005* (2013.01); *G11B 27/031* (2013.01); *H04N 21/4756* (2013.01); *H04N 21/4788* (2013.01); *H04N 21/4882* (2013.01); *G06F 3/04883* (2013.01); *G06F 17/212* (2013.01); *G06F 17/30038* (2013.01)

(58) Field of Classification Search
CPC . G06F 17/241; G06F 17/212; G06F 3/04883; G06F 17/30038; G06F 3/01; G06Q 10/10; G11B 27/00; G11B 27/005; G11B 27/031; H04N 21/4756; H04N 21/4788; H04N 21/4882
USPC .................. 715/230–233, 719–726
See application file for complete search history.

(56) References Cited

U.S. PATENT DOCUMENTS

| | | | |
|---|---|---|---|
| 5,583,980 A * | 12/1996 | Anderson | 345/473 |
| 6,952,673 B2 * | 10/2005 | Amir et al. | 704/235 |
| 2003/0052911 A1 * | 3/2003 | Cohen-solal | 345/738 |
| 2005/0097451 A1 * | 5/2005 | Cormack et al. | 715/512 |
| 2007/0115256 A1 * | 5/2007 | Lee et al. | 345/156 |
| 2007/0286584 A1 * | 12/2007 | Yukimatsu | 386/124 |
| 2009/0248635 A1 * | 10/2009 | Gross | 707/3 |
| 2009/0327856 A1 * | 12/2009 | Mouilleseaux et al. | 715/230 |
| 2010/0250304 A1 * | 9/2010 | Whitaker | G06Q 10/0639 705/7.38 |
| 2012/0278071 A1 * | 11/2012 | Garland et al. | 704/235 |

FOREIGN PATENT DOCUMENTS

JP 2009-077443 A 4/2009

* cited by examiner

*Primary Examiner* — Patrick Riegler
(74) *Attorney, Agent, or Firm* — Sony Corporation

(57) ABSTRACT

An information processor includes: a playback position holder configured to hold a content playback position at which a user starts inputting a comment on content that is being played back; and a comment information holder configured to hold the comment input by the user in association with the content playback position held by the playback position holder.

6 Claims, 10 Drawing Sheets

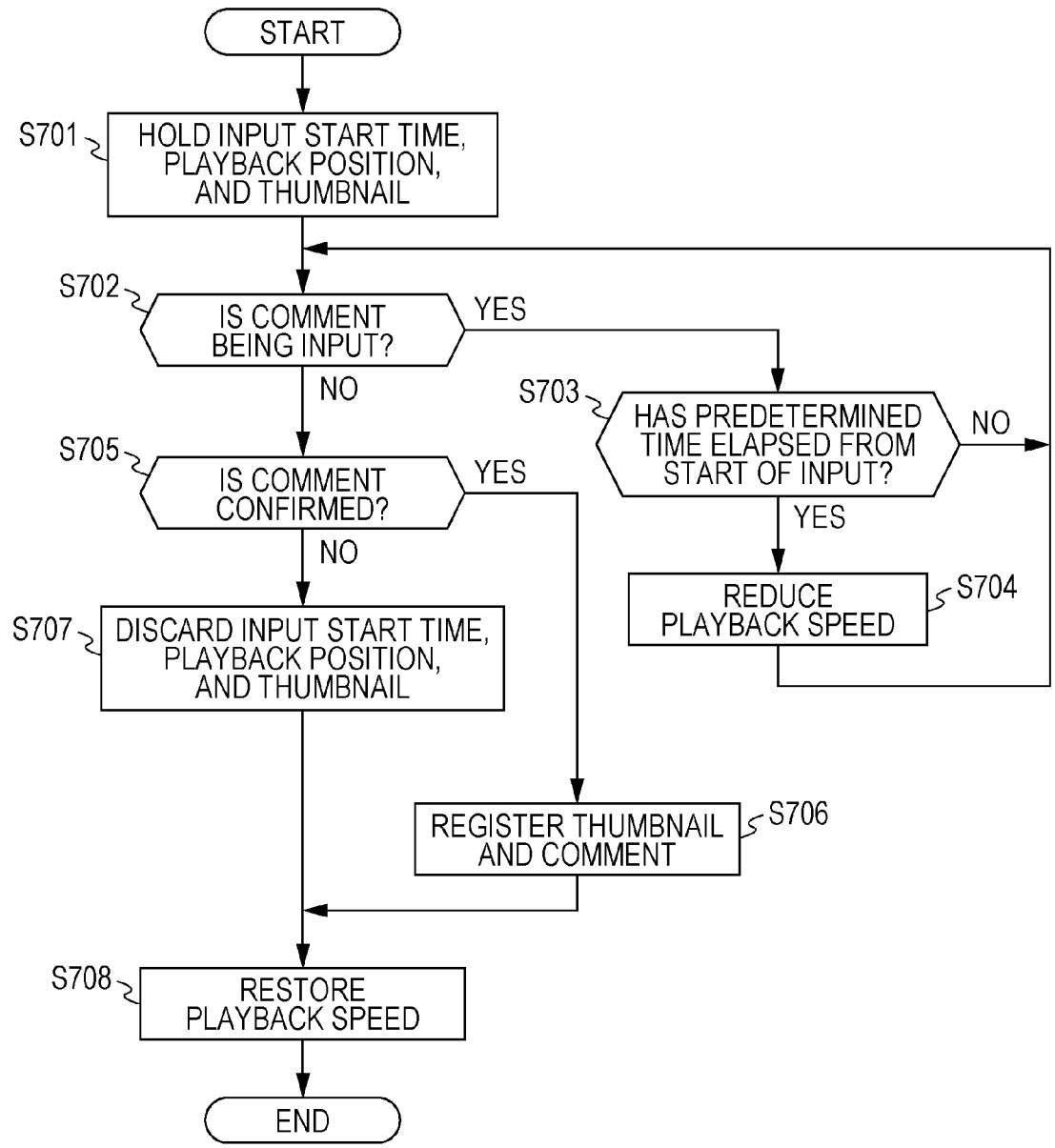

INFORMATION PROCESSOR, INFORMATION PROCESSING METHOD, AND COMPUTER PROGRAM PRODUCT FOR PROCESSING INFORMATION INPUT BY USER

BACKGROUND

The present technology relates to information processors, information processing methods, and computer program products for processing information input by users, and particularly to an information processor, an information processing method, and a computer program product for processing information, e.g., a comment, input by a user while content, e.g., a moving image, is being played back.

In existing systems, a viewer inputs comments on broadcasted television programs, moving images distributed via streaming from moving image-sharing sites on networks, or moving images being played back from Blu-ray Discs. For example, multiple users can share information by commenting on the same content such as a moving image or music.

In general, when a user adds a comment on content, e.g., a moving image, that is being played back, this comment is reflected after the entire comment has been input and confirmed. If a user inputs a long comment or if it takes a long time for the user to input a comment, inconvenience such as inclusion of the comment in a scene that does not match the comment occurs because playback of the content continues while the user is making the comment.

As illustrated in FIG. 8, suppose a user viewing playback content finds a scene to which the user wants to add a comment at a playback position $T_S$, and starts inputting a comment, e.g., "greatest smile!," and the input of the comment is confirmed when the playback position of the content proceeds to a playback position $T_F$. Since it takes several to several tens of seconds to input the comment with a keyboard, however, if the comment is added at the playback position $T_F$ of the content at the time when the input is confirmed, the scene is likely to change while the playback position proceeds from $T_S$ to $T_F$, resulting in the possibility that the comment is added to another scene that does not match the comment of "greatest smile!."

To avoid this possibility, it may be necessary for the user to input a short comment quickly, which might miss the timing. In addition, if the user wants to rewrite the comment or make a relatively long comment, the moving image may be paused or rewound. Such operations hinder enjoyment of the moving image itself.

For example, there is a proposal of a comment distribution system that reads, from input comment information, a comment associated with a comment addition time corresponding to a playback time of a moving image being played back and displays the read-out comment together with the moving image (see, for example, Japanese Unexamined Patent Application Publication No. 2009-77443). The comment addition time, however, is the playback time of the moving image at the time when the comment is input, and thus, it is desirable for a user to input a short comment quickly in order to add a comment to its corresponding scene. If the user rewrites the comment or inputs a relatively long comment, the user will miss the timing at which the comment is to be input.

SUMMARY

It is therefore desirable to provide an information processor, an information processing method, and a computer program product capable of suitably processing information, e.g., a comment, input by a user while content, e.g., a moving image, is being played back.

It is more desirable to provide an information processor, an information processing method, and a computer program product capable of adding a comment to content that is being played back at the time when a user actually intends to input the comment.

In view of the foregoing background, according to an embodiment of the present technology, an information processor includes: a playback position holder configured to hold a content playback position at which a user starts inputting a comment on content that is being played back; and a comment information holder configured to hold the comment input by the user in association with the content playback position held by the playback position holder.

According to another embodiment of the present technology, the comment information holder acquires visual information which allows the content at the content playback position to be visualized, and holds the visual information in association with the comment.

According to another embodiment of the present technology, the information processor further includes a playback speed controller configured to control a playback speed of the content that is being played back in accordance with the progress of input of the comment by the user.

According to another embodiment of the present technology, the playback speed controller reduces the playback speed of the content that is being played back when the start of input of the comment by the user on the content that is being played back is detected.

According to another embodiment of the present technology, the playback speed controller reduces the playback speed of the content that is being played back when a lapse of a predetermined time from the start of input of the comment by the user on the content that is being played back is detected.

According to another embodiment of the present technology, the playback speed controller reduces the playback speed of the content that is being played back when rewriting of the input comment by the user with an input unit is detected.

According to another embodiment of the present technology, the information processor further includes a visual information indicator configured to indicate visual information at each playback position of the content that is being played back together with the comment that is being input by the user on the content that is being played back.

According to another embodiment of the present technology, the visual information indicator indicates the visual information at a plurality of content playback positions including the playback position at which the user starts inputting the comment on the content that is being played back, and records the comment at a playback position corresponding to visual information selected by the user.

According to another embodiment of the present technology, an information processing method includes: holding a content playback position at which a user starts inputting a comment on content that is being played back; and holding the comment input by the user in association with the content playback position that is held.

According to another embodiment of the present technology, a computer-readable computer program product that enables a computer to function as: a playback position holder configured to hold a content playback position at which a user starts inputting a comment on content that is being played back; and a comment information holder configured to hold the comment input by the user in association with the playback position of the content that is held by the playback position holder.

A computer program product according to an embodiment of the present disclosure is a computer program product written in a computer-readable format so as to perform predetermined processing on a computer. Specifically, when being installed on a computer, this computer-readable computer program product implements cooperative functions on the computer, thereby obtaining advantages similar to those obtained by the above-described information processor.

According to the present technology, an information processor, an information processing method, and a computer program product capable of suitably processing information, e.g., a comment, input by a user while content, e.g., a moving image, is being played back are provided.

According to the present technology, when a user views content, e.g., a moving image, and starts inputting a comment, the time when input of the comment is started is recorded, thereby enabling the comment to be added at a content playback position at which the user intends to input the comment. Even when the user makes a long comment or rewrites the comment because of an erroneous input, the comment can be added at a playback position at which the user intends to input the comment. Since the comment can be added at the intended playback position, it may be unnecessary to rewind content to the intended playback position after the user has finished making the comment. As a result, enjoyment of playback content is not hindered.

Other features and advantages of the present technology should become apparent through detailed description based on an embodiment of the present technology, which will be described below, and the appended drawings.

BRIEF DESCRIPTION OF THE DRAWINGS

FIG. 7 is a flowchart showing a procedure for adding a comment on playback content on the information processor;

DETAILED DESCRIPTION OF EMBODIMENTS

Embodiments of the present technology will be described in detail hereinafter with reference to the drawings.

Figure 9:
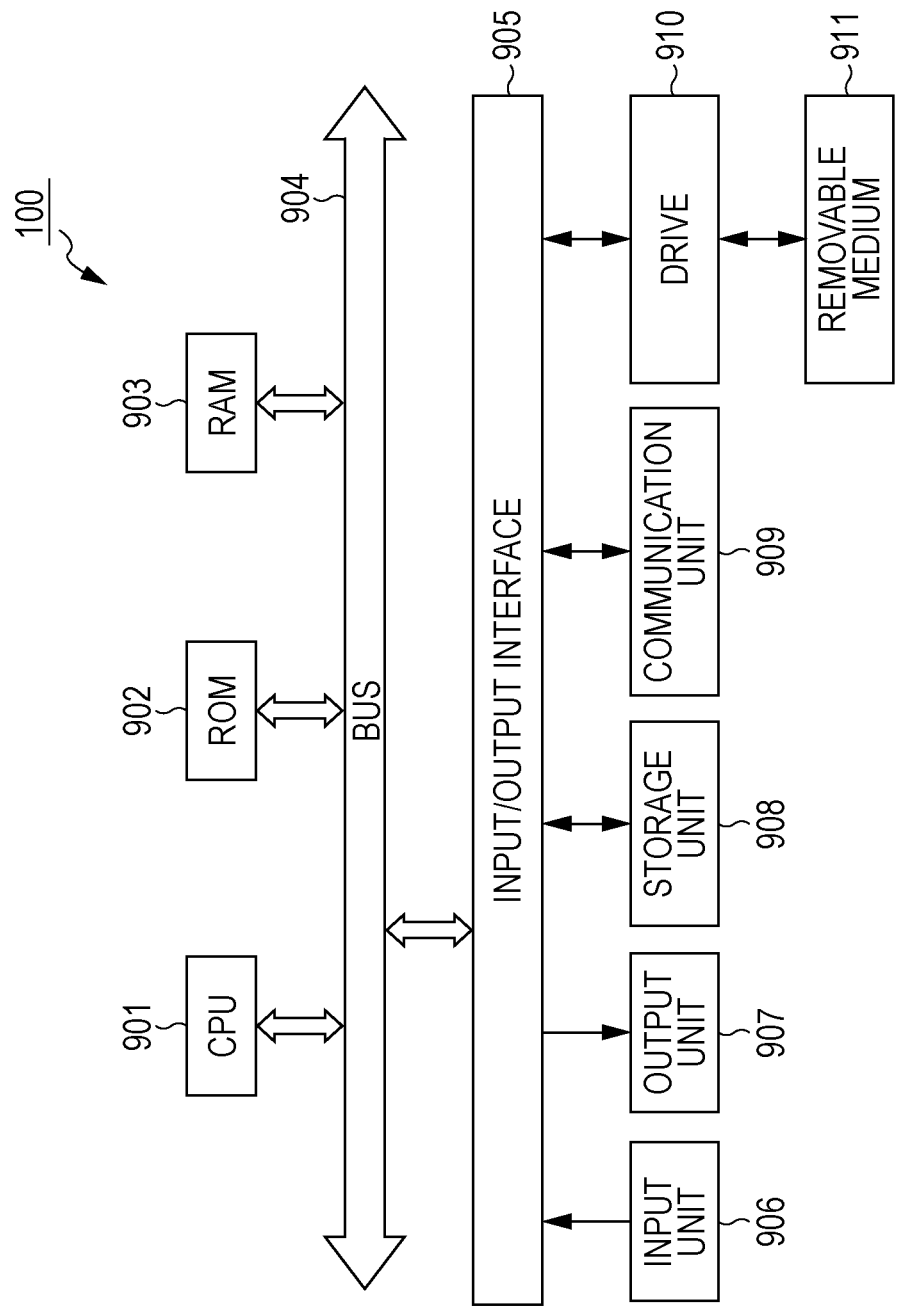
FIG. 9 is a view schematically illustrating a hardware configuration of the information processor according to an embodiment of the present technology.

FIG. 9 schematically illustrates a hardware configuration of an information processor 100 according to an embodiment of the present technology.

A central processing unit (CPU) 901, a read only memory (ROM) 902, a random access memory (RAM) 903 are connected together by a bus 904.

The bus 904 is connected to an input/output interface 905. The input/output interface 905 is connected to an input unit 906 including, for example, a keyboard and a mouse, and an output unit 907 including, for example, a display and a loudspeaker. The input/output interface 905 is also connected to a storage unit 908 including, for example, a hard disk and a nonvolatile memory, a communication unit 909 including, for example, a network interface and a digital broadcast tuner, and a drive 910 for driving a removable medium 911.

On the thus-configured information processor 100, for example, the CPU 901 loads a program stored in the storage unit 908 to the RAM 903 through the input/output interface 905 and the bus 904 and executes the program, thereby performing content playback processing and a series of processing operations (which will be described later) related to input of a comment on content that is being played back.

Programs to be executed by the CPU 901 are recorded on, for example, the removable medium 911. Alternatively, these programs may be provided via wired or wireless transmission media, e.g., a local area network (LAN), the Internet, and/or digital broadcasting, and installed in the storage unit 908.

Programs to be executed by the CPU 901 in the information processor 100 may be programs that are sequentially processed with time in the order described herein, or programs that are processed in parallel or processed at necessary times, e.g., when the programs are called.

Figure 1:
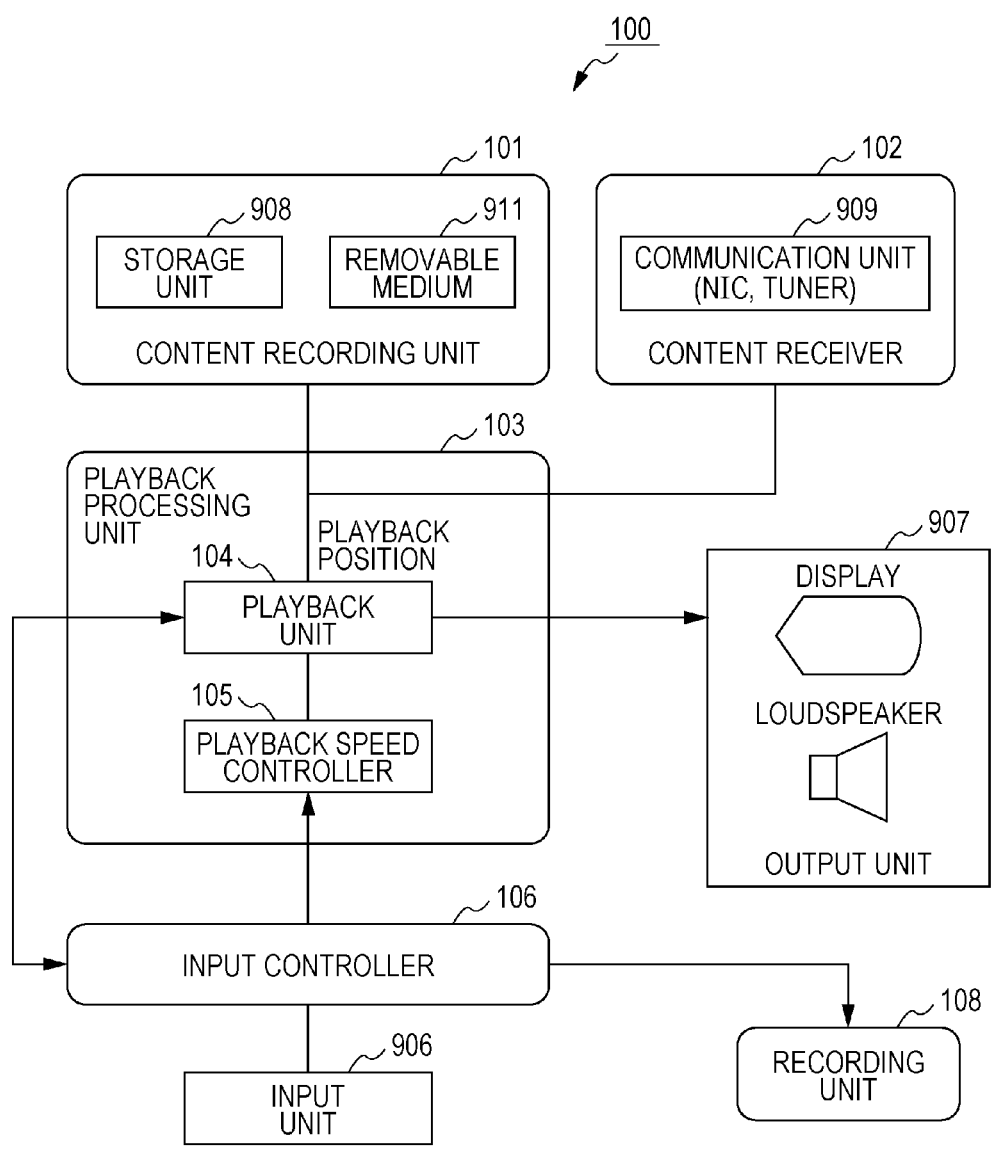
FIG. 1 is a diagram illustrating a functional configuration of an information processor according to an embodiment of the present technology.

FIG. 1 illustrates a functional configuration for performing playback processing of moving image content and comment input processing on content that is being played back in the information processor 100 according to an embodiment of the present disclosure. In FIG. 1, rounded rectangular blocks are basically functional blocks implemented by cooperative operation of programs executed by the CPU 901 and hardware configuration elements in the information processor. These functional blocks may be operated by the single information processor 100. Alternatively, at least some of the functional blocks may be operated by other information processors connected to each other by, for example, a network. Components of the information processor 100 will be described below.

A content recording unit 101 includes: hardware elements, e.g., the storage unit 908, (the drive 910), and the removable medium 911, for recording content, e.g., a moving image, on a recording medium; and a program for reading content from the recording medium. A content receiver 102 includes: a communication unit 909 including, e.g., a network interface and a digital broadcast tuner; and a program for receiving a stream of moving image content from a content distribution server (not shown) on a network via the communication unit 909 and tuning and receiving broadcasted content.

A playback unit 104 plays back content read out from the recording medium in the content recording unit 101 and broadcasted content or network content received by the content receiver 102, causing the output unit 907 including a display and a loudspeaker to output an image and sound of playback content. A playback speed controller 105 controls the playback speed of content played back by the playback unit 104.

The input unit 906 includes devices such as a keyboard and a mouse, and can be used for selecting content to be played back and inputting a comment on content that is being played back by the playback unit 104. A comment may be input not only with the keyboard but also by handwriting with a touch panel or by audio input. A comment input from the input unit 906 is displayed, together with playback content, by the output unit 907. Once the user confirms the comment displayed on the screen, the user can rewrite the input comment with the input unit 906.

An input controller 106 controls a user input from the input unit 906. When the user inputs a comment, with the input unit 906, on content that is being played back by the playback unit 104, the input controller 106 acquires, from the playback unit 104, a content playback position and a thumbnail (or another type of visual information which allows content at the playback position to be visualized) of playback content, and holds the content playback position and the thumbnail together with an input start time of a comment input to the input unit 906 and the input comment. The input controller 106 also outputs a comment that is being input from the input unit 906 and a comment whose input has been confirmed to the playback unit 104. The playback unit 104 displays a comment received from the input controller 106 and the thumbnail on the screen by the output unit 907.

While the user is inputting a comment on playback content, the input controller 106 indicates the playback speed of content to the playback speed controller 105 in accordance with the progress of input of the comment.

Specifically, when the input controller 106 detects that the user starts inputting a comment with the input unit 906, the input controller 106 notifies the playback speed controller 105 of this input, and reduces the playback speed of content in the playback unit 104 until the input of the comment is finished. In another case, when the input controller 106 compares the input start time of the comment with the current time and detects that a predetermined time has elapsed since the user started inputting the comment, the input controller 106 determines that it is taking time to input the comment, notifies the playback speed controller 105 of the determination result, and reduces the playback speed of the content.

Similarly, when the input controller 106 detects that the user is rewriting a comment with the input unit 906, the input controller 106 notifies the playback speed controller 105 of the detection and reduces the playback speed of the content. For example, the input controller 106 can detect that the user is rewriting the comment, on the basis of an action in which the comment is at least partially deleted, e.g., a backspace key is pressed on a keyboard as the input unit 906 or one or more characters are overwritten.

In this manner, since the playback speed decreases while the user is inputting the comment on playback content or when it is taking time for the user to input the comment, the user can input the comment while keeping an impression of a desired scene by looking at an image at a playback position near the desired scene. Thus, the user can more easily input the comment.

Once the user inputs the entire comment or confirms the comment, the input controller 106 records the input start time, the content playback position at the input, a thumbnail associated with the playback position on a recording unit 108. The recording unit 108 herein may be the storage unit 908 in the information processor 100 where the input controller 106 and a playback processing unit 103 operate, a storage unit in a processor different from the information processor 100, or a storage unit in a server system (e.g., a content distribution server or a comment-sharing server) on a network connected to the information processor 100 via the communication unit 909. The application of the content recorded in association with the content playback position is not described herein.

Figure 2:
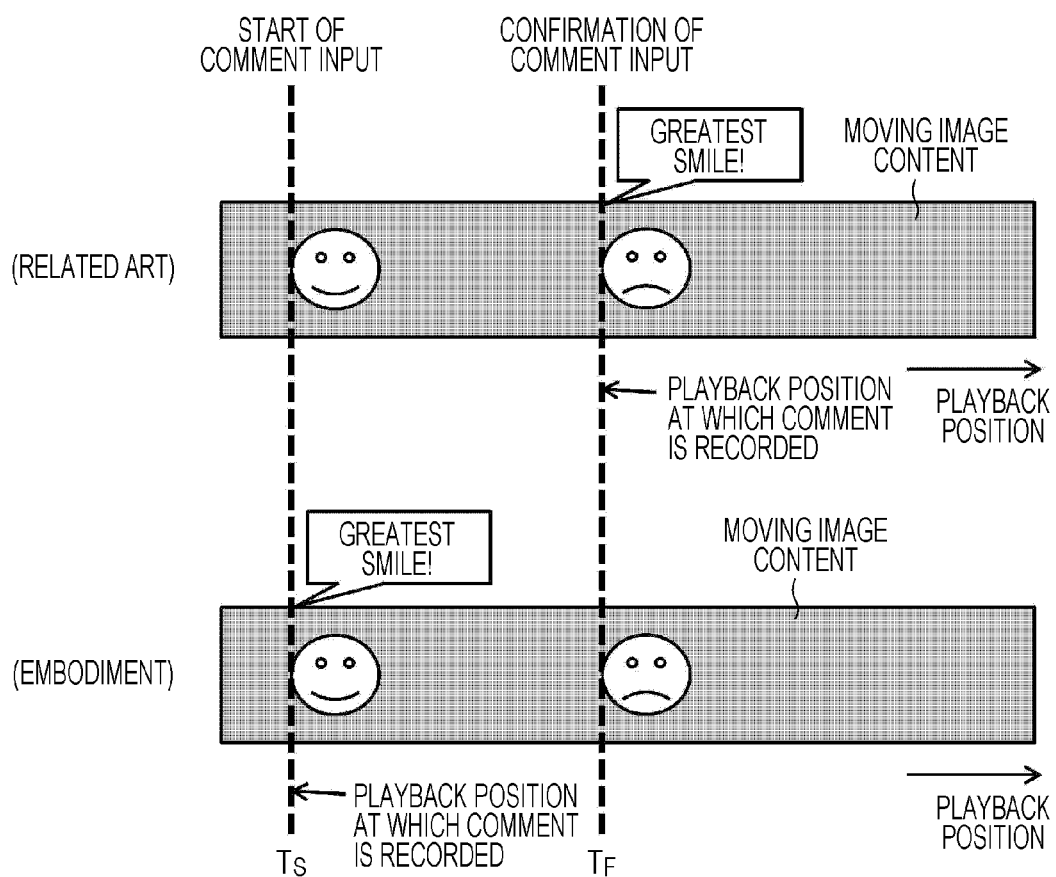
FIG. 2 is an illustration for describing an operation of adding a comment on playback content on the information processor.
Figure 3:
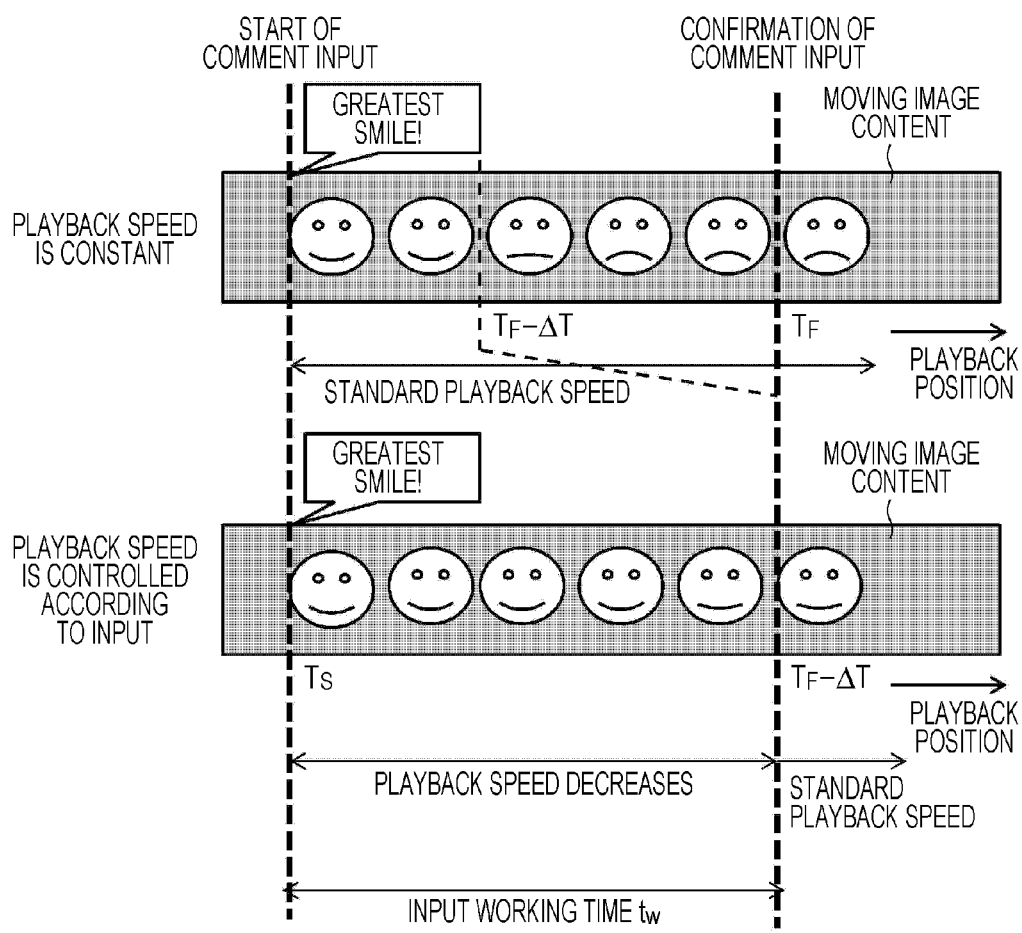
FIG. 3 is an illustration for describing an operation of adding a comment on playback content while controlling the playback speed depending on an input of a comment on the information processor.

Referring now to FIGS. 2 and 3, operation of adding comment on playback content in association with a content playback position on the information processor 100 will be described.

Suppose that a user viewing playback content finds a scene to which the user wants to add a comment at a playback position $T_S$, starts inputting a comment such as "greatest smile!" with the input unit 906, and confirms the input comment at the time when the content proceeds to a playback position $T_F$. As described above, the input controller 106 acquires, from the playback unit 104, and holds the playback position $T_S$ of the content at the time when the user started inputting the comment. Then, when the user confirms the input comment, the input controller 106 records the comment in association with not the playback position $T_F$ at the time when the input comment is confirmed but the playback position $T_S$ at the time when the input of the comment started, as indicated by the lower part of FIG. 2.

The input controller 106 notifies the playback speed controller 105 of the playback speed of the content in accordance with the progress of input of the comment. When the input controller 106 receives a first input of a comment from the user to the input unit 906, the playback unit 104 acquires and holds the playback position $T_S$, and the input controller 106 instructs the playback speed controller 105 to decrease the playback speed of the comment while the user is inputting the comment with the input unit 906. In another case, when the input controller 106 compares the input start time of the comment with the current time and detects that a predetermined time has elapsed since the user started inputting the comment, the input controller 106 determines that it takes time to input the comment, notifies the playback speed controller 105 of the determination result, and reduces the playback speed of the content.

FIG. 3 illustrates, in the upper part, a case where content is continuously played back at a standard playback speed while a comment is being input and, in the lower part, a case where the playback speed is controlled to decrease while a comment is being input. Suppose that in both of the cases where the playback speed is constant and where the playback speed is reduced while a comment is being input, input of the comment takes the same working time $t_w$.

In the case where content is continuously played back at the standard playback speed while a comment is being input as illustrated in the upper part of FIG. 3, the content playback position proceeds to $T_F$ in the working time $t_w$, and it may be necessary for the user to input the comment while looking at an image in which the scene has changed from the time when the user started inputting the comment. On the other hand, in the case where the playback speed is reduced while a comment is being input, the content playback position proceeds only to a playback position $T_F$-$\Delta T$ prior to the playback position $T_F$. That is, since the scene changes to a small degree in the working time $t_w$ due to the reduction of the playback speed, the user can keep looking at an image that negligibly changes from the target scene while inputting the comment. Thus, the user can input the comment while keeping the impression of the target scene.

Similarly, although not shown, in a case where the playback speed is reduced after a predetermined time has elapsed from the input of a comment or a case where the playback speed is reduced after rewriting a comment, for example, the user can easily input a comment while looking at an image that negligibly changes from the target scene.

Figure 4:
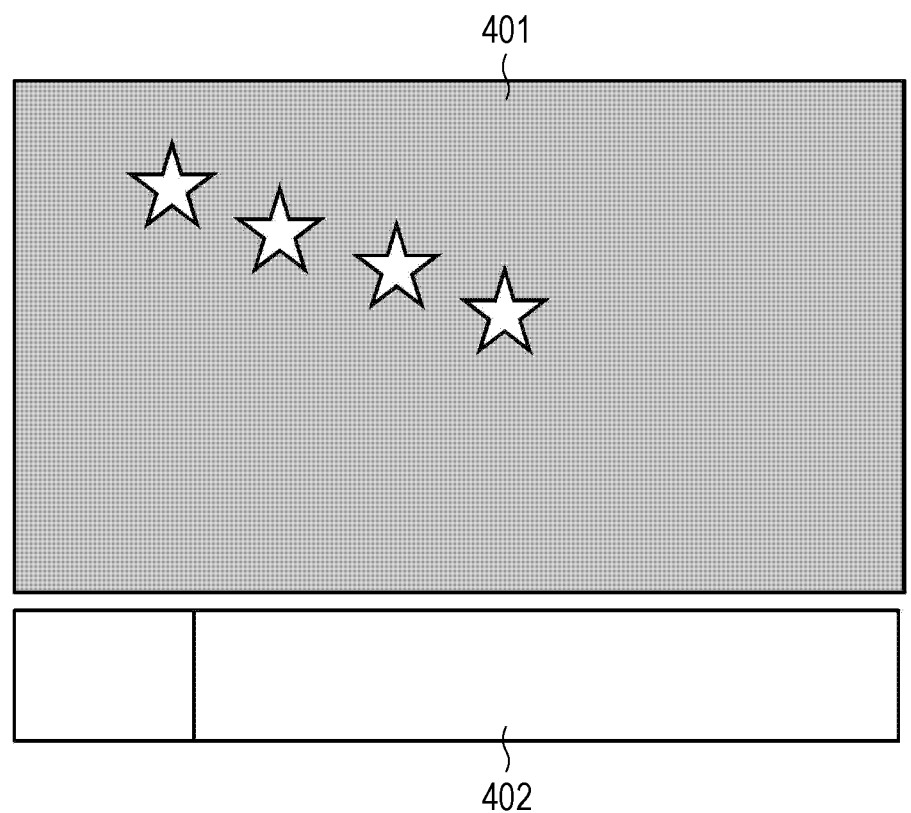
FIG. 4 is an illustration of an example of a content playback frame displayed by an output unit.

FIG. 4 illustrates an example of a content playback frame displayed by the output unit 907. In the example illustrated in FIG. 4, a comment input field 402 is provided at the bottom of a content display region 401 where playback content is displayed. When a comment is input by a user with the input unit 906, the comment is displayed on the comment input field 402.

Every time characters of a comment are input, deleted, or rewritten with the input unit 906, the input controller 106 outputs this character information to the playback unit 104. Then, the playback unit 104 successively updates the display of the comment input field 402. The comment input field 402 may appear on the screen after input of a comment has been started and disappear from the screen before input of the comment is started or after input of the comment has been confirmed.

Figure 5:
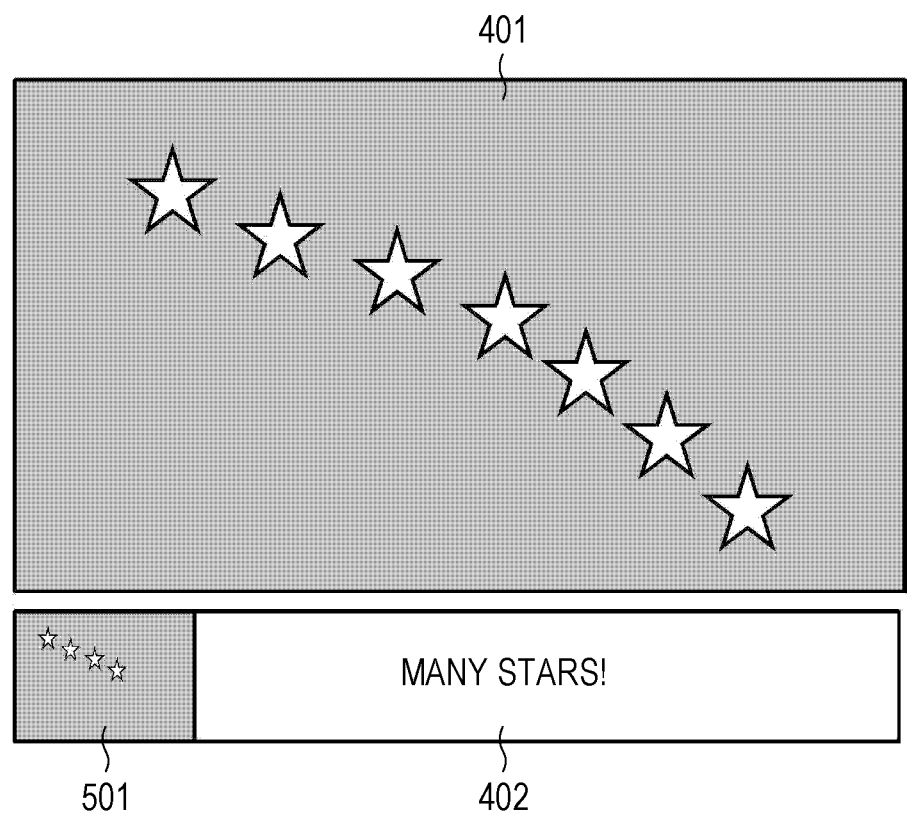
FIG. 5 is an illustration of an example (an example in which a thumbnail at a start of input is displayed together with an input comment) of a content playback frame displayed by the output unit.

As illustrated in FIG. 5, a thumbnail 501 acquired at the playback position $T_S$ corresponding to the input start time is displayed to the left of the comment input field 402. Since content displayed on the content display region 401 proceeds even while the comment is being input, it becomes gradually difficult for the user to recall a scene to which the user intends to add the comment from the content display region. On the other hand, since the thumbnail is a still image of playback content at the time when the input is started, the user can confirm to which scene the user is inputting the comment at any time by referring to the thumbnail 501. In both of the case where content is continuously played back at the standard speed during input of the comment (see the upper part of FIG. 3) and the case where the playback speed is reduced while the comment is being input (see the lower part of FIG. 3), the thumbnail 501 at the playback position $T_S$ may be displayed.

Figure 6A:
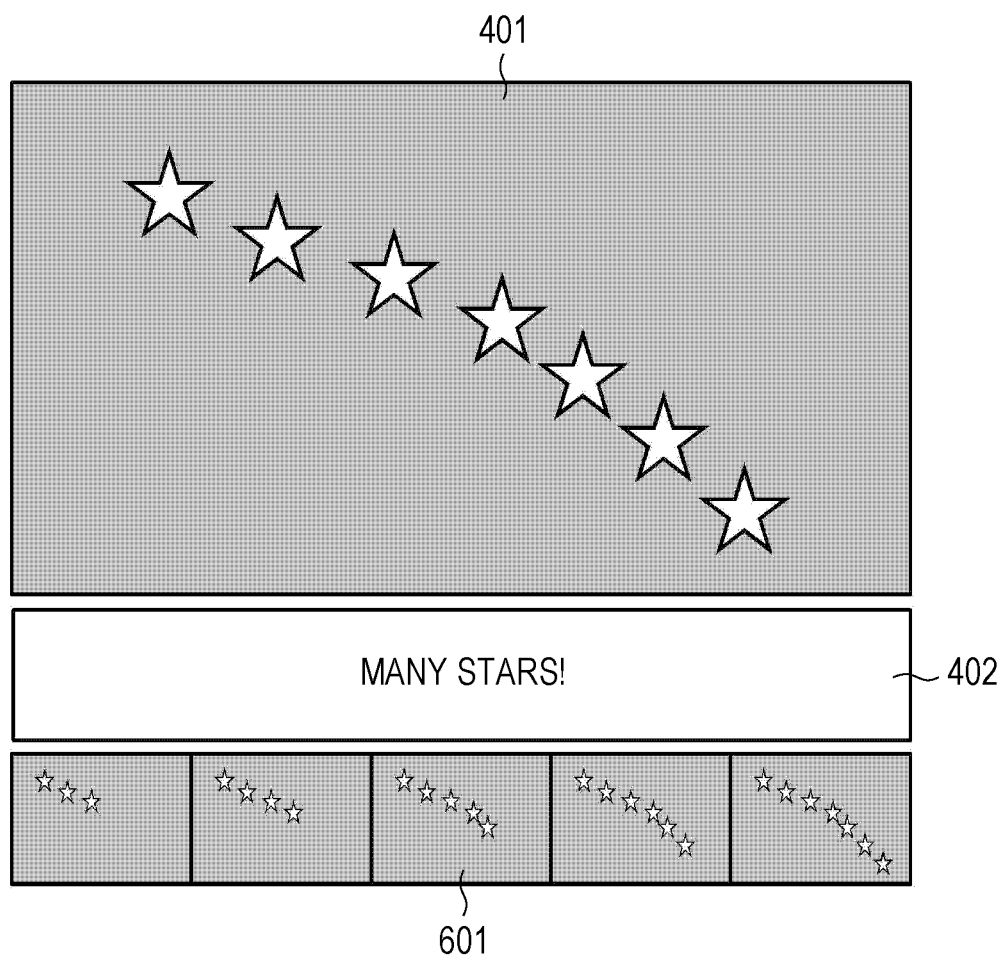
FIG. 6A is an illustration of an example (an example in which a thumbnail display field is provided) of a content playback frame displayed by the output unit.

As illustrated in FIG. 6A, a thumbnail display field 601 may be provided in a place different from the comment input field 402. In the example illustrated in FIG. 6A, the thumbnail display field 601 is provided in parallel with the content input field 402 below the content display field 401. In the thumbnail display field 601, thumbnails of frames of content that is being played back are sequentially arranged from the left to the right in chronological order. In the thumbnail display field 601, a thumbnail of playback content at the time when input is started and thumbnails at a plurality of playback positions around the time when the input is started are displayed in chronological order. For example, the right-end thumbnail is a thumbnail at the current playback position, and the playback position moves toward the past as the thumbnail moves toward the left.

Figure 6B:
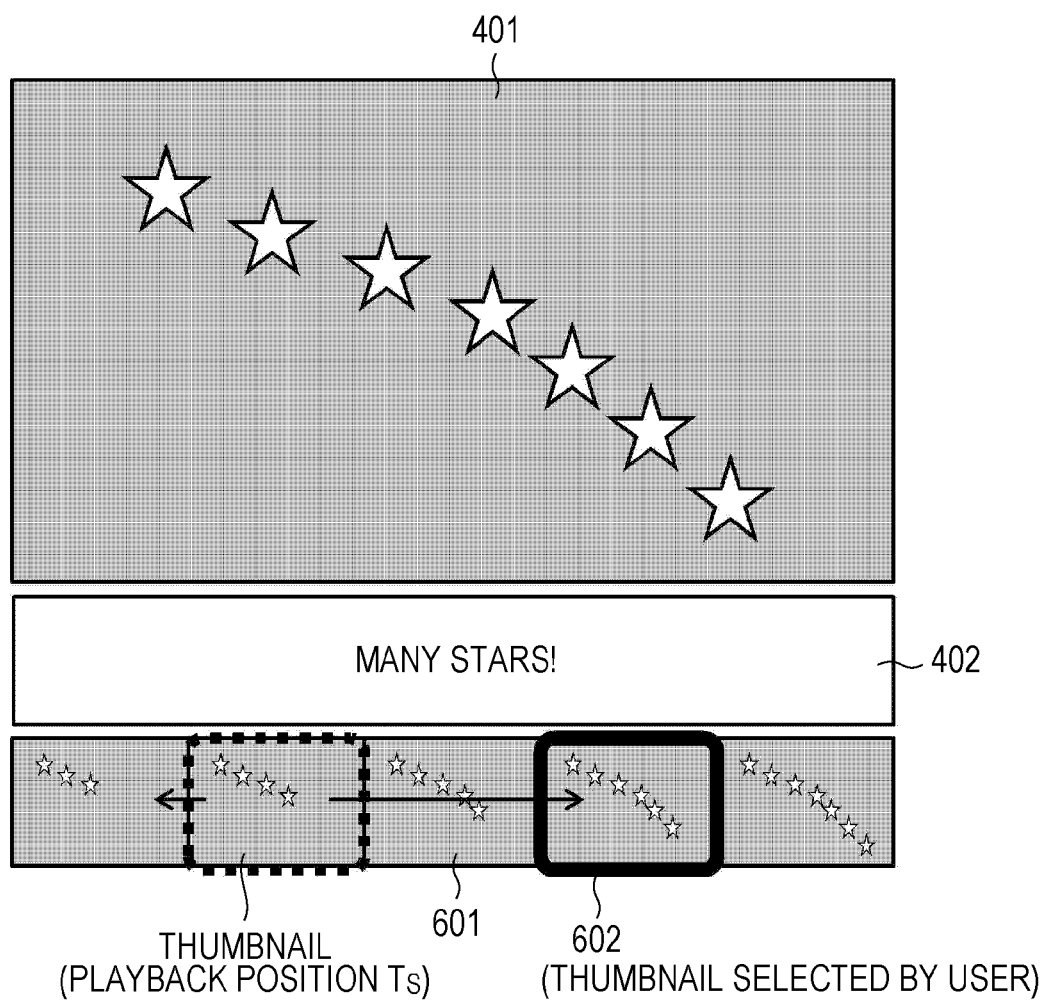
FIG. 6B is an illustration of an example (an example in which a playback position at which a comment is added is adjusted) of a content playback frame displayed by the output unit.
Figure 8:
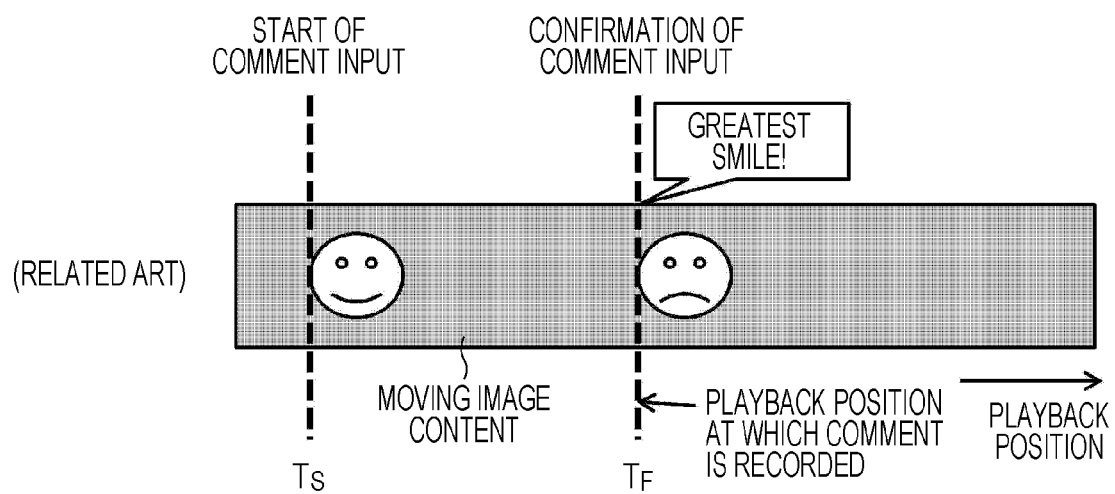
FIG. 8 is an illustration for describing an example of an operation of the related art for adding a comment on playback content.

The information processor 100 has the function of adjusting a playback position at which an input comment is added on the content playback frame. When the user inputs the entire comment and confirms the comment, a cursor 602 enclosing one of the thumbnails displayed in chronological order is displayed on the thumbnail display field 601, as illustrated in FIG. 6B. This cursor 602 is added to the thumbnail at the playback position corresponding to the comment input to the comment input field 402. At the initial time, i.e., immediately after the user has started inputting the comment, the cursor 602 is placed on the thumbnail at the playback position $T_S$ at which the user started inputting the comment. The user can move the cursor 602 on the series of thumbnails in the thumbnail display field 601 by performing an input operation with the input unit 906, and can correct the playback position at which the user intends to input the comment. In the example illustrated in FIG. 6B, the thumbnail at the playback position posterior to the playback position $T_S$ is selected by the cursor 602.

FIG. 7 is a flowchart showing a procedure for adding a comment on playback content on the information processor 100.

The procedure is initiated when the user starts inputting a comment with the input unit 906. First, the input controller 106 holds an input start time, and acquires, from the playback unit 104, and holds a playback position $T_S$ of content at the start of input and a thumbnail associated with the playback position $T_S$ (step S701). Although not shown in the flowchart of FIG. 7, the playback position $T_S$ held at step S701 may be subsequently changed by operation of the user in some cases, as illustrated in FIG. 6B.

Then, the input controller 106 determines whether input of the comment by the user with the input unit 906 is finished or not (step S702). For example, the input controller 106 determines whether input of the comment is finished or not on the basis of whether an enter key has been pressed to confirm characters input to the comment input field 402.

If input of the comment by the user with the input unit 906 continues, i.e., if the input of the comment is not finished (i.e., Yes at step S702), the input controller 106 measures the time elapsed from the input start time held by the input controller 106 to the current time. If the input controller 106 detects that a predetermined time has elapsed from the start of input (i.e., Yes at step S703), the input controller 106 notifies the playback speed controller 105 of this detection, determines that it takes time to input the comment, and reduces the playback speed of content (step S704). Alternatively, the input controller 106 may skip the determination at step S703 and, immediately after the start of input of the comment with the input unit 906, notifies the playback speed controller 105 of the input in order to reduce the playback speed of the content.

On the other hand, if the user finishes inputting the comment (i.e., No at step S702), the input controller 106 further determines whether the input comment is confirmed or not (step S705).

If the comment input by the user with the input unit 906 is confirmed (i.e., Yes at step S705), the input controller 106 records a corresponding content playback position and a thumbnail associated with the playback position on the recording unit 108 (i.e., registers them along with a comment added at the playback position) (step S706). Although not shown in the flowchart of FIG. 7, the playback position at which the user adds the comment may be changed, in some cases, from the playback position $T_S$ when the input of the comment is started, as illustrated in FIG. 6B.

If the comment whose input has been finished is not confirmed (i.e., No at step S705), the input controller 106 discards the input start time, the playback position, and the thumbnail recorded at step S701 (step S707).

Then, the input controller 106 instructs the playback speed controller 105 to restore the playback speed of the content (step S708), and this procedure routine is finished.

In this manner, when the user views content such as a moving image and starts inputting a comment, the input start time of this comment is recorded on the information processor 100, thereby enabling the comment to be added at a content playback position at which the user intends to add the comment. Even if the user makes a long comment or rewrites a comment because of an erroneous input, the comment can be added at the playback position intended by the user.

The present technology may have the following configurations:
(1) An information processor including: a playback position holder configured to hold a content playback position at which a user starts inputting a comment on content that is being played back; and a comment information holder configured to hold the comment input by the user in association with the content playback position held by the playback position holder.
(2) The information processor according to item (1), wherein the comment information holder acquires visual information which allows the content at the content playback position to be visualized, and holds the visual information in association with the comment.
(3) The information processor according to item (1) further including a playback speed controller configured to control a playback speed of the content that is being played back in accordance with progress of input of the comment by the user.
(4) The information processor according to item (3), wherein the playback speed controller reduces the playback speed of the content that is being played back when the start of input of the comment by the user on the content that is being played back is detected.
(5) The information processor according to item (3), wherein the playback speed controller reduces the playback speed of the content that is being played back when a lapse of a predetermined time from the start of input of the comment by the user on the content that is being played back is detected.
(6) The information processor according to item (3), wherein the playback speed controller reduces the playback speed of the content that is being played back when rewriting of the input comment by the user with an input unit is detected.
(7) The information processor according to item (2) further including a visual information indicator configured to indicate visual information at each playback position of the content that is being played back together with the comment that is being input by the user on the content that is being played back.
(8) The information processor according to item (7), wherein the visual information indicator indicates the visual information at a plurality of content playback positions including the playback position at which the user starts inputting the comment on the content that is being played back, and records the comment at a playback position corresponding to visual information selected by the user.
(9) An information processing method including: holding a content playback position at which a user starts inputting a comment on content that is being played back; and holding the comment input by the user in association with the content playback position that is held.
(10) A computer-readable computer program product that enables a computer to function as: a playback position holder configured to hold a content playback position at which a user starts inputting a comment on content that is being played back; and a comment information holder configured to hold the comment input by the user in association with the playback position of the content that is held by the playback position holder.

The present disclosure contains subject matter related to that disclosed in Japanese Priority Patent Application JP 2012-170451 filed in the Japan Patent Office on Jul. 31, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processor comprising:
a storage unit configured to store content to be played back; and
a central processing unit (CPU) configured to:
    initiate playback of the content;
    hold, in the storage unit, a content playback position at which a user starts inputting a first comment on the content that is being played back;
    hold, in the storage unit, the first comment input by the user in association with the content playback position; and
    control a playback speed of the content that is being played back in accordance with progress of input of the first comment by the user, wherein the control of the playback speed comprises:
        reducing the playback speed of the content that is being played back when a lapse of a predetermined time from the start of input of the first comment by the user on the content that is being played back is detected; and
        reducing the playback speed of the content that is being played back based on detection of rewriting of a second comment previously input by the user.

2. The information processor according to claim 1, wherein the CPU is further configured to: acquire visual information which allows the content at the content playback position to be visualized, and hold the visual information in association with the first comment.

3. The information processor according to claim 1, wherein the CPU is configured to indicate visual information at each playback position of the content that is being played back together with the first comment that is being input by the user on the content that is being played back.

4. The information processor according to claim 3, wherein the visual information is indicated at a plurality of content playback positions including the playback position at which the user starts inputting the first comment on the content that is being played back, and wherein the CPU records the first comment at a playback position corresponding to the visual information selected by the user.

5. An information processing method comprising:
in an information processor comprising a storage unit and a central processing unit (CPU):
    holding, in the storage unit, a content playback position at which a user starts inputting a first comment on content that is being played back;
    holding, in the storage unit, the first comment input by the user in association with the content playback position that is held; and
    controlling a playback speed of the content that is being played back in accordance with progress of input of the comment by the user, wherein the control of the playback speed comprises:
        reducing the playback speed of the content that is being played back when a lapse of a predetermined time from the start of input of the first comment by the user on the content that is being played back is detected; and
        reducing the playback speed of the content that is being played back based on detection of rewriting of a second comment previously input by the user.

6. A non-transitory computer-readable storage medium having stored thereon, a set of computer-executable instructions that when executed by a computer, causes the computer to perform steps comprising:
   holding, in a storage unit, a content playback position at which a user starts inputting a first comment on content that is being played back;
   holding, in the storage unit, the first comment input by the user in association with the playback position of the content; and
   controlling a playback speed of the content that is being played back in accordance with progress of input of the comment by the user, wherein the control of the playback speed comprises:
      reducing the playback speed of the content that is being played back when a lapse of a predetermined time from the start of input of the first comment by the user on the content that is being played back is detected; and
      reducing the playback speed of the content that is being played back based on detection of rewriting of a second comment previously input by the user.

\* \* \* \* \*